United States Patent
Ho et al.

(10) Patent No.: US 7,805,801 B2
(45) Date of Patent: Oct. 5, 2010

(54) APPARATUS FOR CLEANING A RUBBING CLOTH

(75) Inventors: Yueh-Tun Ho, Taichung Hsien (TW); Chin-Hsiung Chang, Kaohsiung (TW)

(73) Assignee: Au Optronics Corp., Hsinchu (TW)

( * ) Notice: Subject to any disclaimer, the term of this patent is extended or adjusted under 35 U.S.C. 154(b) by 0 days.

(21) Appl. No.: 12/423,410

(22) Filed: Apr. 14, 2009

(65) Prior Publication Data

US 2009/0193609 A1    Aug. 6, 2009

Related U.S. Application Data

(62) Division of application No. 11/092,880, filed on Mar. 30, 2005, now Pat. No. 7,559,111.

(30) Foreign Application Priority Data

May 18, 2004  (TW) ............................... 93113965 A

(51) Int. Cl.
*A46B 15/00* (2006.01)
*B08B 11/00* (2006.01)

(52) U.S. Cl. .................................... 15/256.51; 134/198

(58) Field of Classification Search ................. 15/233, 15/256.51; 134/198
See application file for complete search history.

(56) References Cited

U.S. PATENT DOCUMENTS

| 1,588,160 | A  | 6/1926  | Booty |
| 1,615,436 | A  | 1/1927  | Booty |
| 2,825,915 | A  | 3/1958  | Black |
| 4,953,252 | A  | 9/1990  | Akisawa et al. |
| 6,378,154 | B1 | 4/2002  | Corrado et al. |
| 7,287,297 | B2 | 10/2007 | Okano et al. |

OTHER PUBLICATIONS

Ho, et al., Non-Final Office Action, mailed May 1, 2008, filing date Mar. 30, 2005, U.S. Appl. No. 11/092,880.
Ho, et al., Final Office Action, mailed Dec. 15, 2008, filing date Mar. 30, 2005, U.S. Appl. No. 11/092,880.
Ho, et al., Advisory Action, mailed Mar. 6, 2009, filing date Mar. 30, 2005, U.S. Appl. No. 11/092,880.
Ho, et al., Advisory Action, mailed Mar. 20, 2009, filing date Mar. 30, 2005, U.S. Appl. No. 11/092,880.

*Primary Examiner*—Randall Chin
(74) *Attorney, Agent, or Firm*—Thomas, Kayden, Horstemeyer & Risley, LLP

(57) ABSTRACT

An apparatus for cleaning a rubbing cloth disposed on an alignment roller includes: a first support member to be disposed parallel to the alignment roller; a second support member to be disposed parallel to the alignment roller and spaced apart from the first support member at a predetermined distance; and a cleaning cloth disposed on and extending between the first and second support members. The cleaning cloth cleans the rubbing cloth by rubbing.

2 Claims, 5 Drawing Sheets

APPARATUS FOR CLEANING A RUBBING CLOTH

CROSS-REFERENCE TO RELATED APPLICATION

This application is a divisional application of U.S. application Ser. No. 11/092,880, filed Mar. 30, 2005 incorporated by reference herein in its entirety.

FIELD OF THE INVENTION

The invention relates to a cleaning apparatus, more particularly to a cleaning apparatus for removing dirt from a rubbing cloth by rubbing a cleaning cloth against the rubbing cloth.

BACKGROUND OF THE INVENTION

An alignment layer is disposed on a glass substrate of an LCD panel. The alignment layer is generally made of polyamide material. During manufacturing of the LCD device, rubbing operation is conducted so as to form several parallel grooves on the alignment layer to align the liquid crystal molecules in the same direction.

Referring to FIG. 1, a rubbing cloth 10 is wrapped around an alignment roller 11 by means of two-sided adhesive tape. The rubbing cloth 10 rubs against the alignment layer disposed on the glass substrate 12 upon rotation of the roller 11. After the rubbing operation, the alignment layer is formed with a plurality of parallel alignment grooves 122 that enable the molecules 121 in the alignment layer to be aligned with the alignment grooves 122. Once contaminated due to rubbing, the rubbing cloth 10 is required to be cleaned up, then the alignment layer 10 is eligible for conducting the rubbing operation again. In case, the dirt on the rubbing cloth 10 is not removed thoroughly and when the rubbing operation is conducted by using the contaminated rubbing cloth 10, the parallel alignment grooves in the alignment layer may surfer from uneven depth distribution after the rubbing operation, which, in turn, may affect the pre-tilt angle of the crystal molecules in the alignment layer.

Referring to FIG. 2, in order to thoroughly remove the dirt 14 on the rubbing cloth 10, a blank glass substrate is passed through the roller 11 in such a manner to rub against the rubbing cloth 10 so as to suck up the dirt 14, thereby cleaning the rubbing cloth 10.

Some disadvantages resulting from the use of the aforesaid roller 11 are as follows:

(i) Replacing a new rubbing cloth 10 on the roller 11 brings lots of inconveniences to the user. To discard the contaminated rubbing cloth 10 may result in extra expense, since the rubbing cloth is rather expensive;

(ii) Little cleaning effect is achieved with the use of the blank glass substrate. The glass substrate 13 can remove only some portion of the dirt 14;

(iii) The contaminated glass substrate needs to be discarded, since the glass substrate cannot be recycled, thereby resulting in environmental pollution and extra manufacture cost; and (iv) Cleaning of the rubbing cloth 10 by using the blank glass substrate 13 may interrupt the manufacturing processes of the LCD device, since the roller 11 itself is used for rubbing against the alignment layer in order to form the alignment grooves thereon.

SUMMARY OF THE INVENTION

The object of the present invention is to provide a cleaning apparatus that is adapted to be mounted in an LCD manufacturing line, that is adapted to remove dirt from a rubbing cloth which is used for rubbing a substrate of an LCD system and that can eliminate the aforesaid disadvantages.

An apparatus is provided according to the present invention for cleaning a rubbing cloth disposed on an outer surface of an alignment roller. The apparatus includes: a first support member disposed parallel to the alignment roller; a second support member disposed parallel to the alignment roller and spaced apart from the first support member at a predetermined distance; and a cleaning cloth disposed on and extending between said first and second support members. The rubbing cloth is conditioned (is cleaned up) by rubbing with the cleaning cloth.

BRIEF DESCRIPTION OF THE DRAWING

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
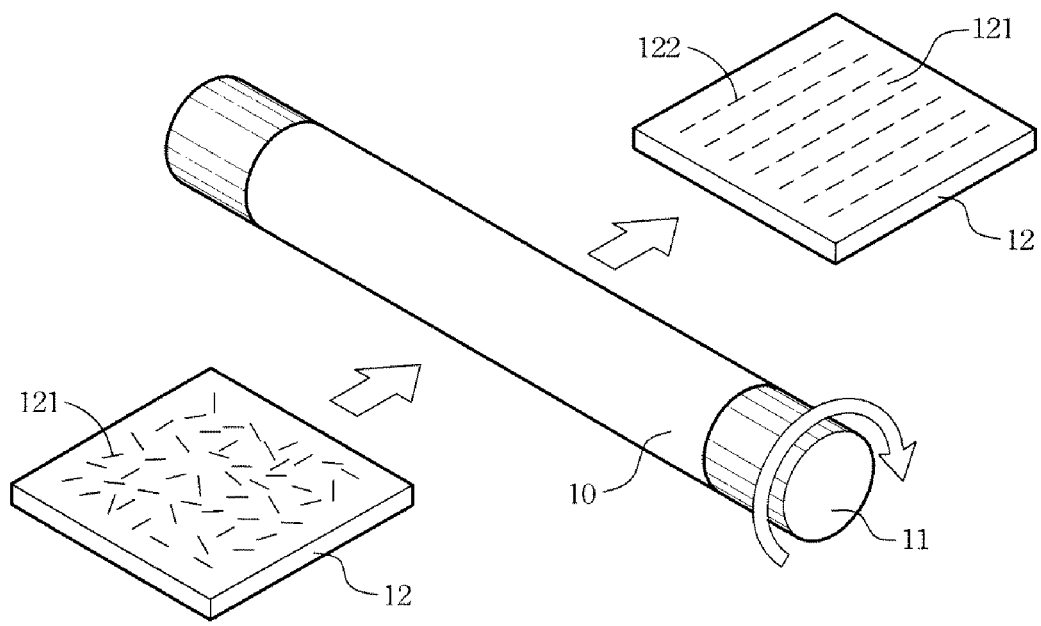
FIG. 1 is a perspective view of a conventional alignment roller for rubbing an alignment layer used in an LCD system, illustrating how the alignment layer is rubbed by a rubbing cloth wrapped around the alignment roller so as to form a plurality alignment grooves on the alignment layer.
Figure 2:
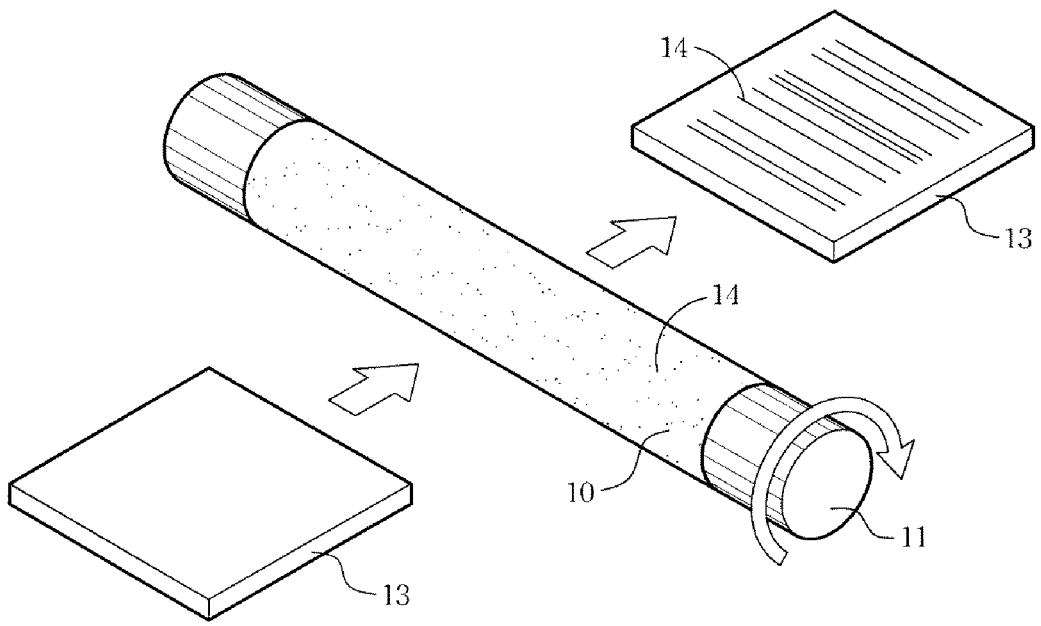
FIG. 2 is a perspective view of the conventional alignment roller, illustrating how the dirt on the rubbing cloth is removed with the use of a blank glass substrate.

It should be noted that same reference numerals have been used to denote similar elements throughout the specification.

Figure 3A:
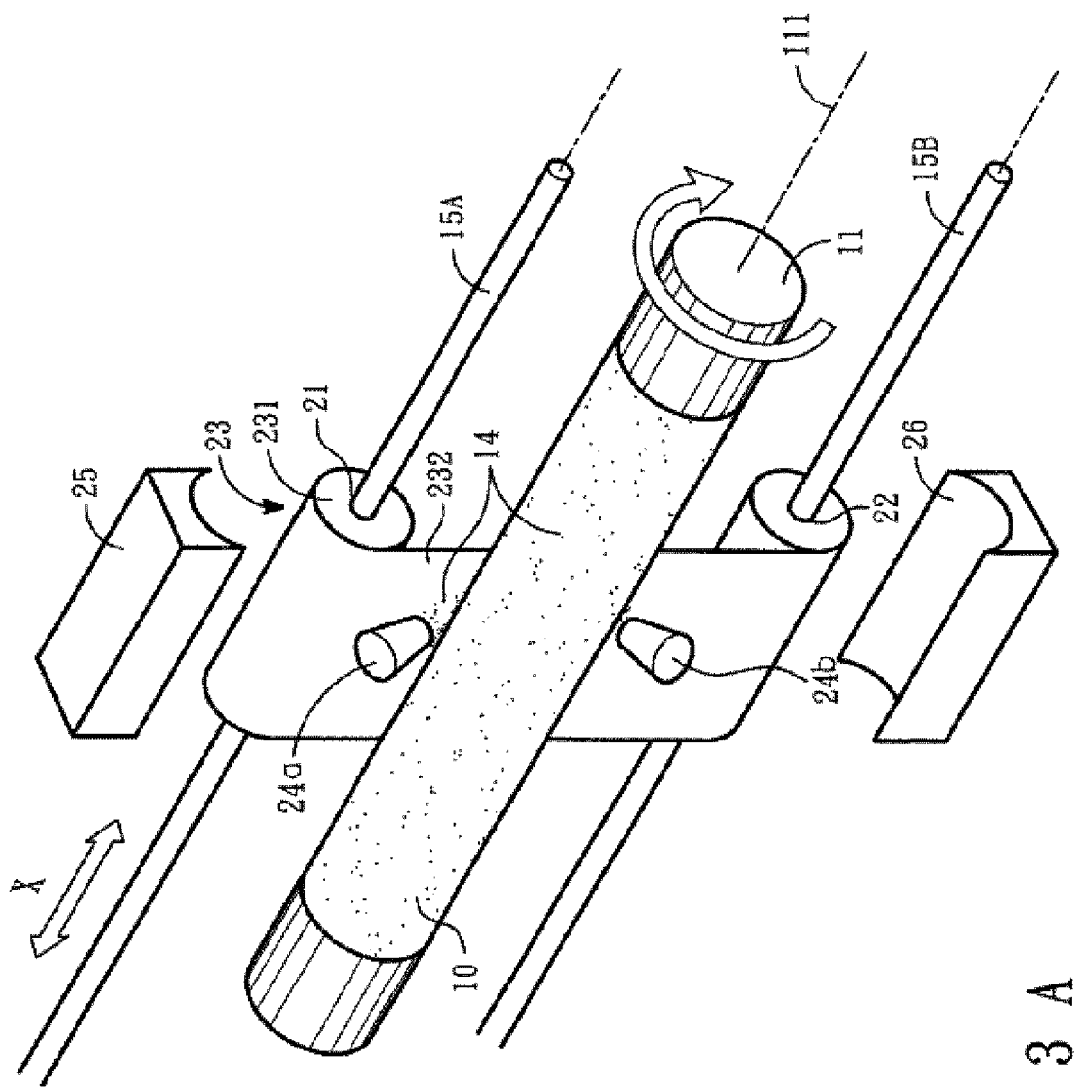
FIG. 3A is a perspective view of a cleaning apparatus according to one embodiment of the present invention.
Figure 3B:
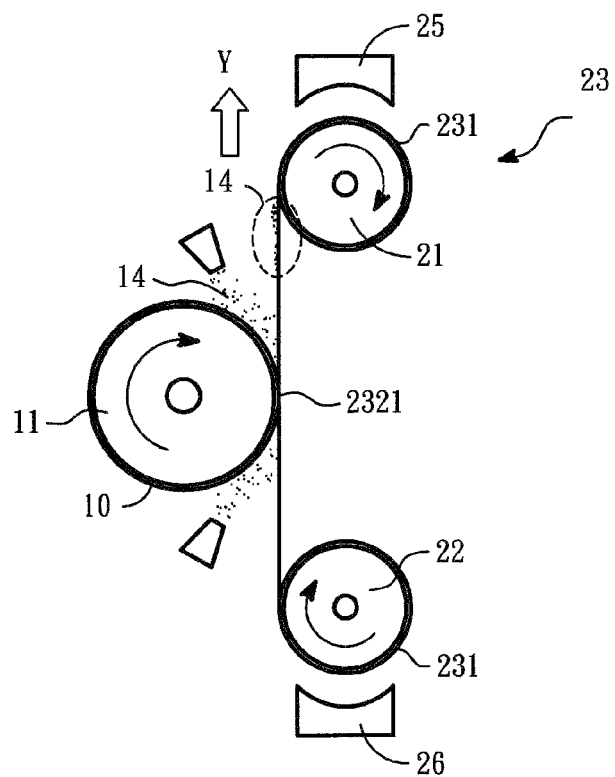
FIGS. 3B and 3C respectively show a side view of the cleaning apparatus according to FIG. 3A.
Figure 3C:
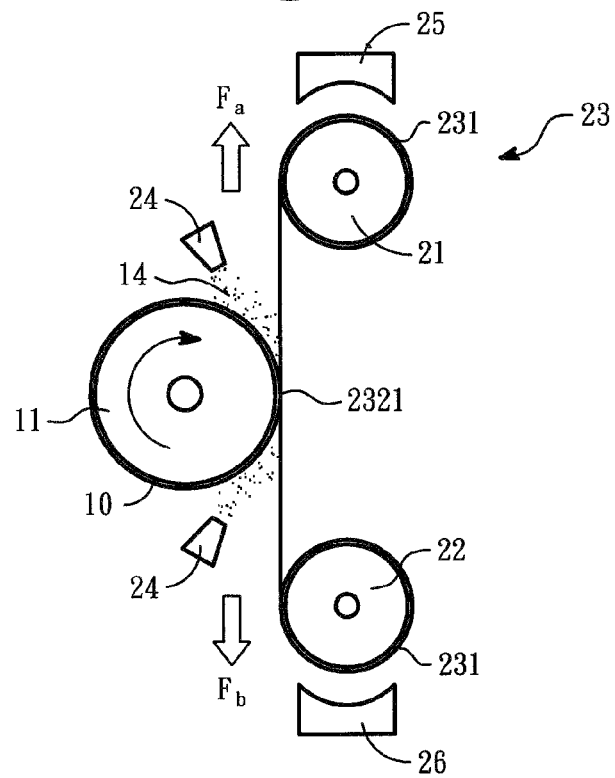

Referring to FIGS. 3A, 3B and 3C, a cleaning apparatus of the preferred embodiment according to the present invention is shown. The cleaning apparatus mounted in the LCD manufacturing line (not shown) includes an alignment roller 11, a first support member 21, a second support member 22, a roll of a cleaning cloth 23, first and second fastening members 25, 26, first and second nozzles 24a, 24b, and first and second mounting shafts 15A, 15B.

As illustrated, the alignment roller 11 is wrapped by the rubbing cloth 10 for rubbing against an alignment layer (not shown) disposed on a glass substrate (not shown) during the manufacturing processes of an LCD system. The glass substrate constructs a display panel of an LCD system. The rubbing operation results in formation of a plurality of parallel grooves in the alignment layer. The rubbing cloth 10 may get dirty or is contaminated after a long period of rubbing operation. The first mounting shaft 15A is disposed at the right side of the alignment roller 11 at a higher elevation so as to extend parallel with the axis 111 of the roller 11. The second mounting shaft 15B is disposed at the right side of the roller 11 at a lower elevation so as to extend parallel with the axis 111 of the roller 11. The first and the second support members 21, 22 are respectively fixed on the first and second mounting shafts 15A, 15B. Each of the first and the second support members 21, 22 generally has a cylinder shape. Alternately, the first and second support members 21, 22 can be rollers.

The cleaning cloth 23 has two opposite distal ends 231 respectively fixed to the first and the second support members 21, 22 so that a cloth section 232 extends between the distal ends 231. The first and the second nozzles 24a, 24b are respectively disposed at upper and lower sides of the roller 11 adjacent to the cloth section 232 of the cleaning cloth 23. When it is desired to condition (or remove) the dirt 14 from the rubbing cloth 10, the first and the second support members 21, 22 are respectively turned in clockwise and anticlockwise directions with a torque $T_A(T_B)$ (see FIG. 3C), and are retained stationarily thereat (see FIG. 3B). At this condition, the cloth section 232 of the cleaning cloth 23 is held between the first and second support members 21, 22 under tension force $F_a(F_b)$ and slidably contacts with the rubbing cloth 10 on the roller 11.

Under this arrangement, rotation of the roller 11 may result in rubbing operation between the rubbing cloth 10 and the cloth section 232 of the cleaning cloth 23. The dirt 14 being removed from the rubbing cloth 10 is collected in a dirt-collecting bag (not shown) via the nozzles 24. Of course the first and second nozzles 24a, 24b are connected to a suction motor (not shown), which is activated synchronously with the roller 11 in order to suck up the dirt 14.

Means for moving the first mounting shaft 15A along the X direction is provided so as to occasionally move the same with respect to the second mounting shaft 15B after stoppage of the roller 11 once there is too much dirt powder on the first support member 21.

Figure 3D:
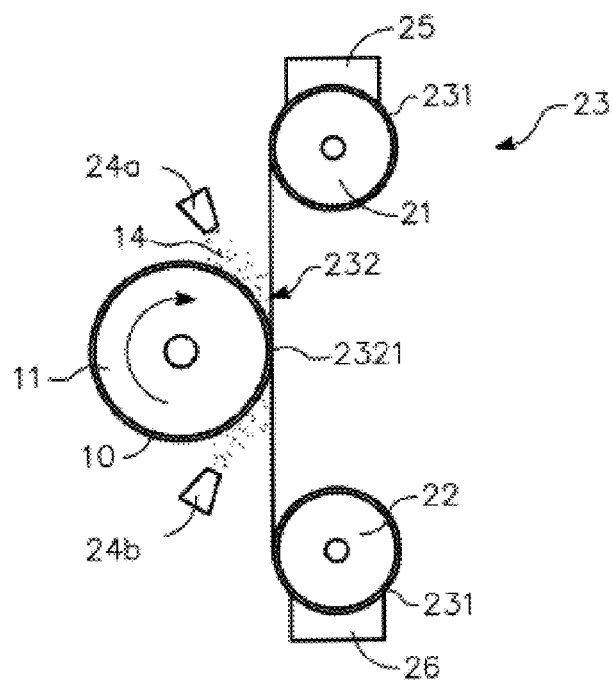
FIGS. 3D and 3E respectively show a side view of the cleaning apparatus according to an embodiment of the present invention, illustrating how a cleaning cloth is retained securely between first and second holding members.
Figure 3E:
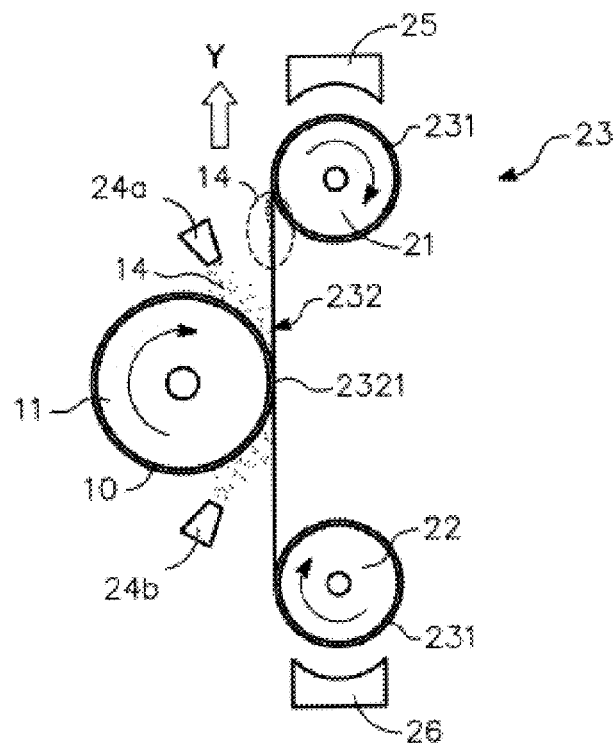

Referring to FIGS. 3D and 3E. In this preferred embodiment, the first and the second fastening members 25, 26 are mounted respectively and securely on the first and second support members 21, 22 in order to retain the cloth section 232 (or the new cloth section 2321) between the first and second support members 21, 22 under tension. Each of the first and the second fastening members 25, 26 is formed with an elongated concave recess to mate with the respective support members so as to provide firm gripping force between an adjacent pair of the support and fastening members.

In the event, the cloth section 232 of the cleaning cloth 23 wears out or gets dirty due to the rubbing operation against the rubbing cloth 10 after a period of time, the first and the second fastening members 25, 26 are removed respectively from the first and the second support members 21, 22 as best shown in FIG. 3E. The first support member 21 can be rotated in the arrow Y direction for a predetermined angle (see FIG. 3E) so as to produce a new cloth section 2321. The new cloth section 2321 is held under tension as described in the abovementioned manner.

Figure 4B:
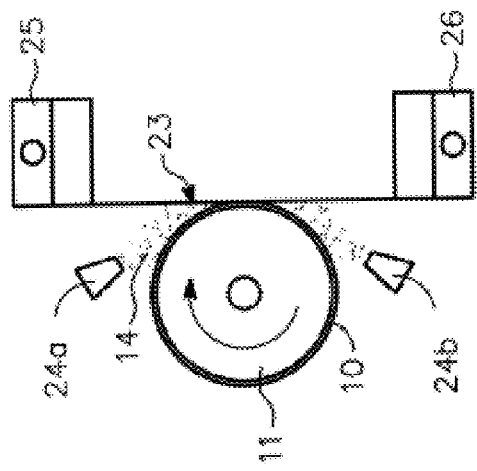
FIG. 4B is a side view of the modified cleaning apparatus according to FIG. 4A.
Figure 4A:
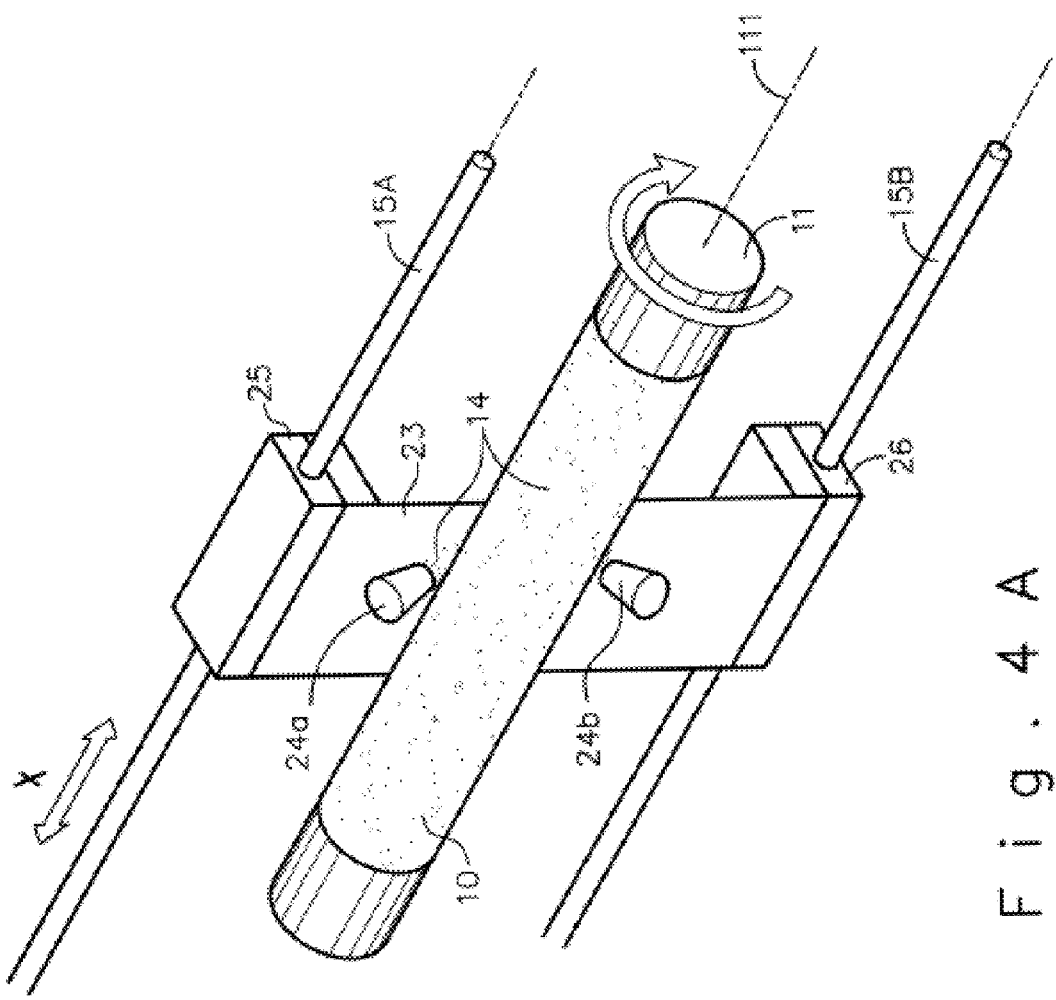
FIG. 4A is a perspective view of a modified cleaning apparatus according to an embodiment of the present invention which is adapted to be mounted in LCDs manufacturing line.

Referring to FIGS. 4A and 4B, a modified preferred embodiment of a cleaning apparatus according to the present invention is shown to have a structure similar to the previous embodiment. The only difference resides in that the cloth section of the cleaning cloth 23 is held securely by the first and second fastening members 25, 26 without employment of the first and second support members. However, each of the first and second fastening members 25, 26 includes a stationary piece mounted securely on a respective mounting shaft and a movable piece movable relative to the stationary piece for securely holding a respective distal end of the cleaning cloth so as dispose the cloth section between the first and second fastening members 25, 26 under tension.

Some advantages provided by the cleaning apparatus of the present invention are as follows:

(i) Only a small amount of expense is required to construct the present cleaning apparatus, since the roller 11 is already exited in the LCD manufacturing line. Arrangement of the first and second support members 21, 22 at upper and lower elevations of the roller 11 will not need extra process. Hence, no large expense is needed;

(ii) Since the dirt resulting from rubbing operation between the rubbing cloth and the cloth section of the cleaning cloth are directly and immediately collected by virtue of nozzles, the ambient environment of the present cleaning apparatus is cleaned and no environmental pollution would be caused; and (iii) The cost of cleaning cloth is cheaper than that of the glass substrate, thereby lowering the manufacturing cost of the LCD system.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An apparatus for cleaning a rubbing cloth disposed on an outer surface of an alignment roller, and the apparatus comprising:
    a first fastener;
    a second fastener disposed parallel to said first fastener and spaced apart from the first fastener at a predetermined distance;
    a cleaning cloth disposed on and extending between said first and second fasteners;
    a nozzle disposed adjacent to said first fastener for removing dirt resulting from a rubbing operation performed between said cleaning cloth and said rubbing cloth; and
    wherein the first and the second fasteners are respectively turned in clockwise and anticlockwise directions with a torque, and are retained stationarily thereat, and said cleaning cloth is held between the first and second fasteners under tension force.

2. The apparatus according to claim 1, further comprising a mounting shaft, wherein the first fastener is slidably mounted on the mounting shaft.

* * * * *